No. 765,493. PATENTED JULY 19, 1904.
E. KOSCINSKI.
REFLECTION MEASURING INSTRUMENT.
APPLICATION FILED JAN. 7, 1904.
NO MODEL. 3 SHEETS—SHEET 1.
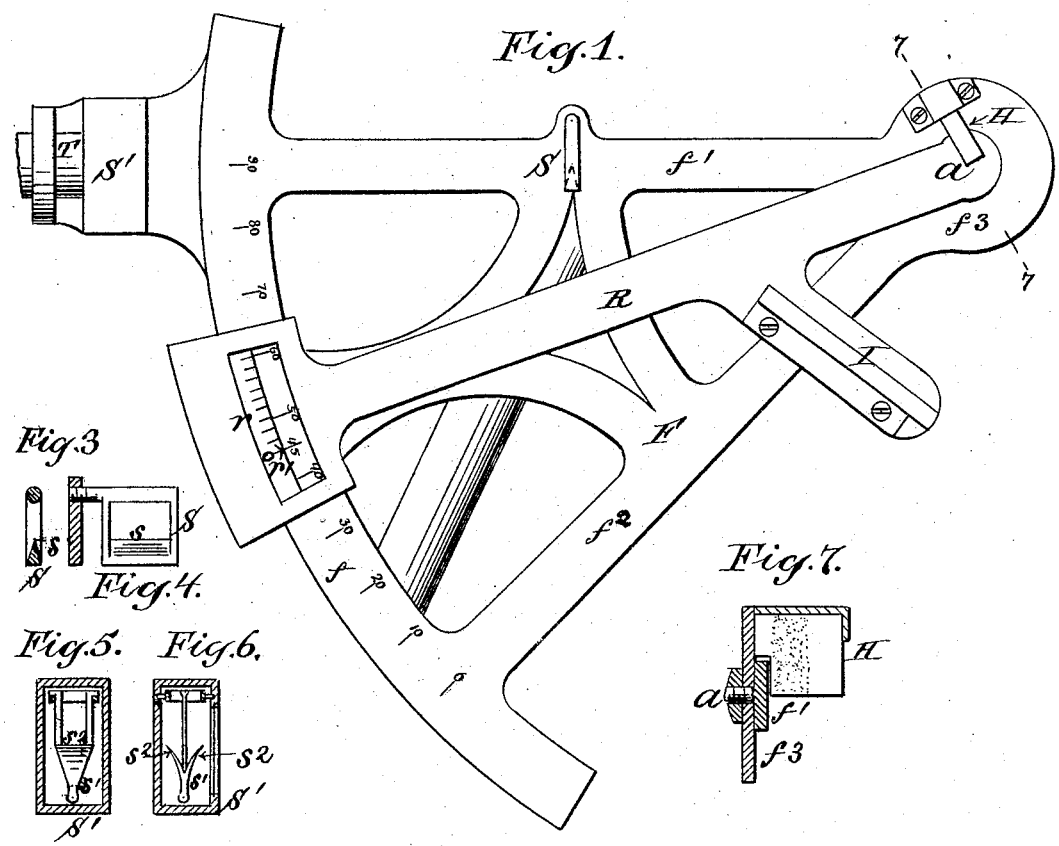
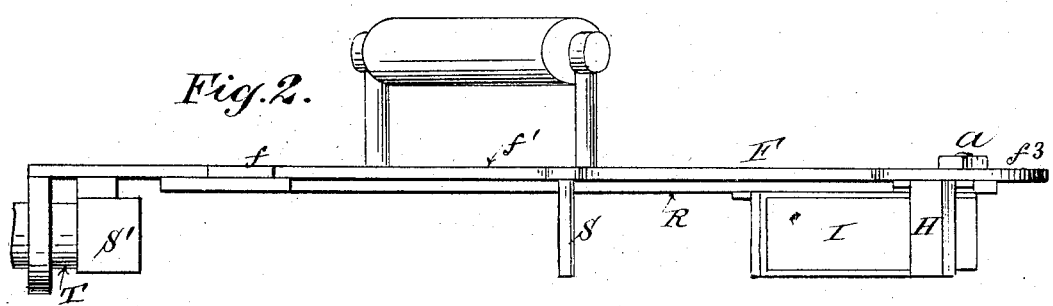
Witnesses:
D. W. Gardner
T. Beal
Inventor:
Ernest Koscinski
By his Attorney
Geo. Wm. Miatt

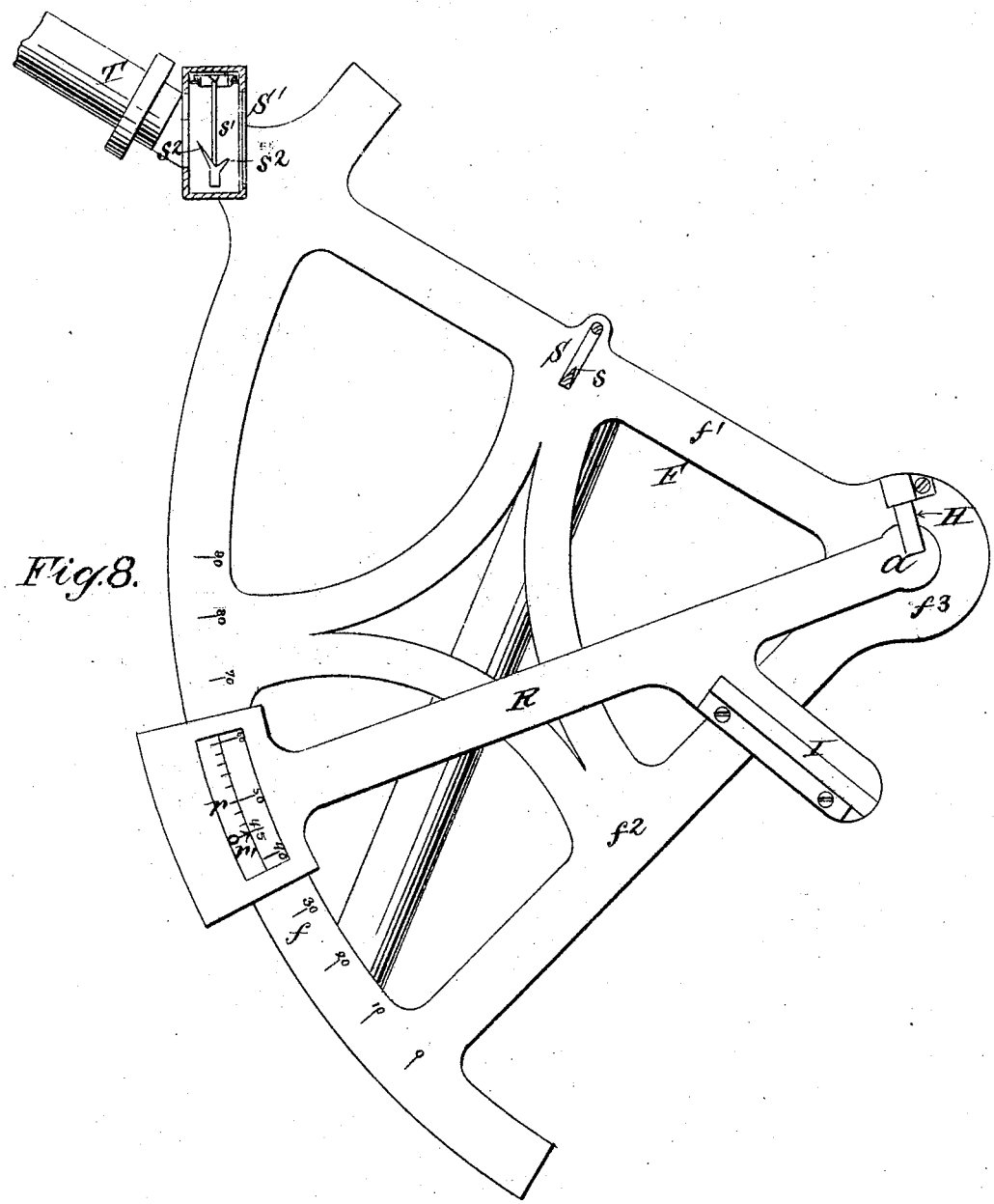

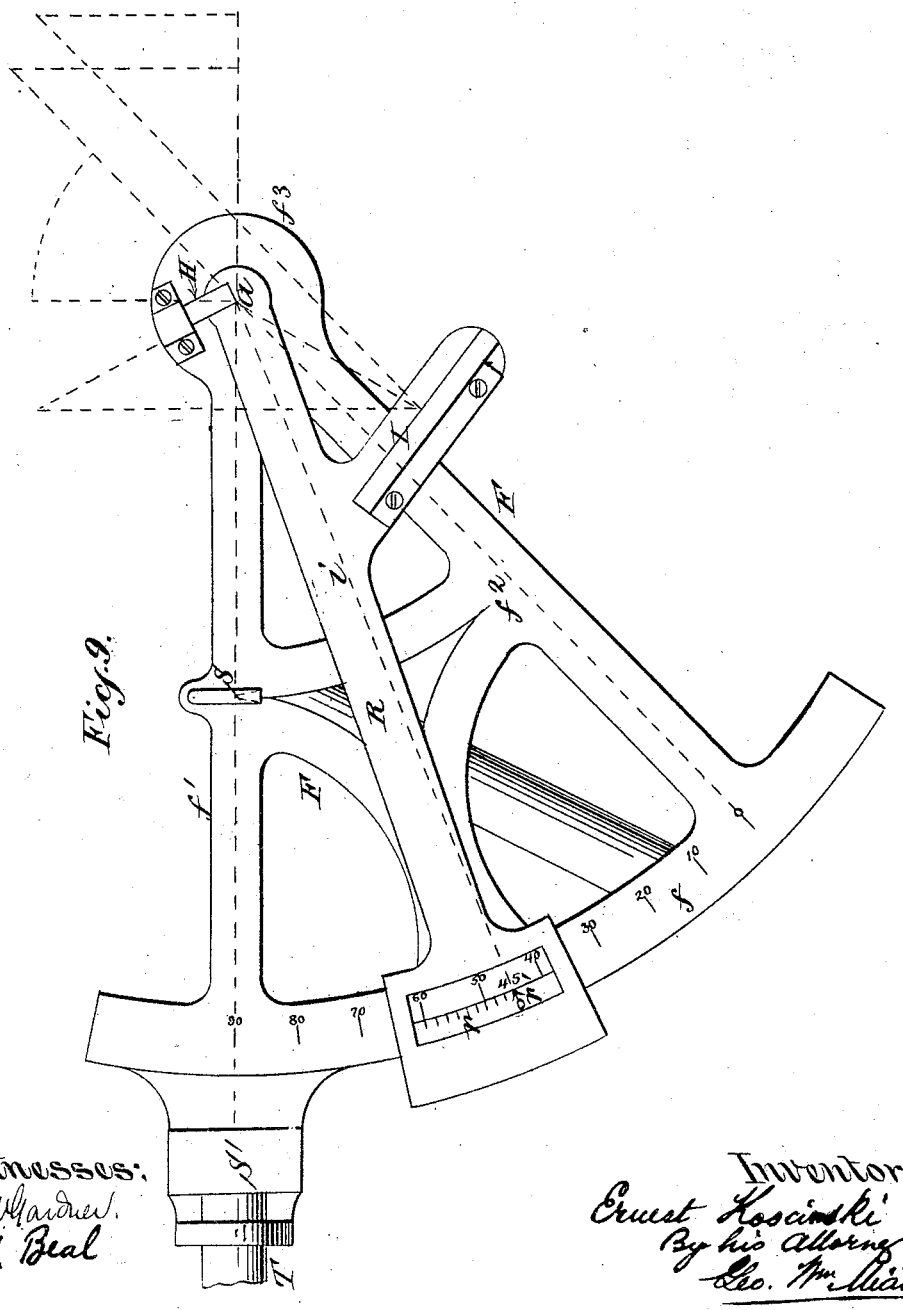

No. 765,493. Patented July 19, 1904.

UNITED STATES PATENT OFFICE.

ERNEST KOSCINSKI, OF JERSEY CITY, NEW JERSEY.

REFLECTION-MEASURING INSTRUMENT.

SPECIFICATION forming part of Letters Patent No. 765,493, dated July 19, 1904.

Application filed January 7, 1904. Serial No. 188,001. (No model.)

*To all whom it may concern:*

Be it known that I, ERNEST KOSCINSKI, a citizen of the United States, residing in Jersey City, Hudson county, and State of New Jersey, have invented certain new and useful Improvements in Reflection-Measuring Instruments, of which the following is a specification sufficient to enable others skilled in the art to which the invention appertains to make and use the same.

My invention relates to reflecting mathematical instruments, and is designed mainly to afford a positive and reliable artificial horizon within the instrument itself. The instrument may be designated as an "octant" and is intended more particularly for zenith or high-altitude observations.

A distinguishing feature of my invention consists in utilizing the axis of the index-bar in lieu of the natural horizon by means of sights which when brought into coincidence with the said axis create and insure a perfect artificial horizon superior to the natural one in that all possible errors appertaining to refraction are avoided and in that it is available at all times and under all conditions of weather. Incidentally in this connection my invention includes certain features in the construction and arrangement of the sights used in connection with the axial line of the index-arm as an artificial horizon, whereby delicacy and accuracy of adjustment are attained.

Another important feature of my invention and one arising from the use of the axial line of the index-arm in lieu of the natural horizon consists in fixing the horizon-mirror to the frame so that its plane is radial to the said axis and in placing the index-mirror upon the index-bar and at a prescribed angle with relation to the index-line thereon. By thus providing for the measurement of angles from the central point I increase the accuracy of the instrument and reduce the degree of index connection necessary in making very close observations, as for astronomical purposes.

In the accompanying drawings, Figure 1 is an elevation of the essential parts of my improved reflection-measuring instrument; Fig. 2, a top view of the instrument; Figs. 3 and 4, detail views of the intermediate sight; Figs. 5 and 6, detail views of the plumb-sight; Fig. 7, a sectional elevation upon plane of line 7 7, Fig. 1; Fig. 8, an elevation of a modification of my instrument, showing the sights in section; Fig. 9, a diagrammatic view similar to Fig. 1, illustrating the radial lines in a measurement involving an angle of forty-five degrees.

In the above-described figures I have omitted shade-glasses, index-reader, and other details used upon the sextant and similar instruments and equally adapted for use in connection with my improved instrument. My aim is to show and describe the essential features of my invention and not to confine myself to the exact form and construction of parts shown, which may be modified in detail without departing from the spirit and intent of my invention.

F represents the usual framework of an instrument of this character, formed with the radial members $f'$ $f^2$, supporting the arc limb $f$, which is graduated in the usual manner, except that the ninety-degree mark corresponds with the horizontal line when the instrument is adjusted for use.

R is the movable radius-bar pivotally connected to the hub or head $f^3$ of the frame F. The outer extremity of this index-bar is formed with a vernier $r$, having the zero-degree pointer $r'$. The index-mirror I is affixed to the radius-bar R, with its plane at a permanent angle of sixty degrees with relation to the imaginary index-line $i$, (dotted in Fig. 9,) extending radially from the axis $a$ to the pointer $r'$ on the vernier $r$.

The axial line $a$ is rendered visual by the lower edge of the horizon-glass H, which is made to coincide accurately with said axis $a$. One-half of the horizon-glass H is left unsilvered in the usual manner to allow direct rays to pass unobstructed to the telescope T, and it is rigidly mounted on the hub $f^3$ at a prescribed angle with relation to a line passing from the axis $a$ to the ninety-degree mark on the arc $f$. This angle depends upon the line of sight arranged for in the instrument. Thus in Figs. 1 and 9, in which the telescope T and sights S S' are arranged in line with the ninety-degree mark and the axis $a$, the angle at which the plane of the horizon-glass H is set is sixty degrees with relation to said horizontal line between ninety-degree mark and the axis $a$, whereas in the modification shown in Fig. 8, in which the telescope and sights are set to register at an angle of thirty degrees with relation to the said horizontal line between the ninety-degree mark and the axis $a$, the said horizon-glass is set at an angle of seventy-five degrees with relation to said horizontal line between ninety-degree mark and axis $a$. In either case the result is the same in so far as observations are concerned, since the coincidence of the sight-lines and the axial line of the telescope with the axis $a$ denotes that the artificial horizon is attained, and the subsequent adjustment of the index-bar so that the ray from a distant object will be reflected and focused by the index-mirror I on the axis $a$ will indicate the distance of the object from the zenith.

One or more sighting devices may be used in conjunction with the telescope T and axial line $a$. I prefer to use two sighting devices interposed in the line of sight—one, S, having a fixed knife-edge $s$ intermediate, or approximately so, between the axis $a$ and the telescope T, and the other, S', consisting of a plumb $s'$, formed with one or more (preferably two) sight-points $s^2$. The plumb $s'$ is mounted in gimbals within a suitable box attached to the frame of the instrument, so as to swing freely in all directions and insure its attaining its center of gravity, to the end that when its sight-points $s^2$ coincide with the knife-edge $s$ and the axial line $a$ the artificial horizon will be attained, with the ninety-degree mark and the axis $a$ in the true horizontal plane.

It is obvious that a prism or equivalent device may be substituted in lieu of the mirror H, if preferred, provided the axial line $a$ of observation is maintained, and that like the sextant and similar instruments this instrument may be used in the measurement of angles between objects terrestial, although my instrument is designed, primarily, for stellar, zenith, or high-altitude observations, in which a true horizon is of special importance. It will be seen that in this respect my instrument is practically independent of surface weather conditions, since while the natural horizon is frequently hidden or distorted it is seldom, even under unfavorable conditions of weather, that zenith observations cannot be made provided a correct horizontal plane can be attained for the instrument, and this I render possible at all times by means entirely within the instrument itself, a result never heretofore attained, so far as I am aware, in a reflecting mathematical instrument.

What I claim as my invention, and desire to secure by Letters Patent, is—

1. In a reflection-measuring instrument, the combination with the frame and arc limb thereof, of an index-arm carrying an index-mirror set at an angle of sixty degrees with relation to the plane of a line between the vernier zero-mark and the axis upon which the index-arm turns, a reflector coincident with the said axial line, and instrumentalities for ascertaining when the said axial reflector and the ninety-degree mark on the arc are in the same plane horizontally, for the purpose set forth.

2. In a reflection-measuring instrument, the combination with the frame and arc limb thereof, of an index-arm carrying an index-mirror set at an angle of sixty degrees with relation to the plane of a line between the vernier zero-mark and the axis upon which the arm turns, a reflector coincident with the said axial line, and a plurality of sights arranged to indicate, by their coincidence with the axial reflector, when the latter and the ninety-degree mark on the arc are in the same horizontal plane for the purpose described.

3. In a reflection-measuring instrument, the combination with the frame and arc limb thereof, of an index-arm carrying an index-mirror set at an angle of sixty degrees with relation to the plane of a line between the vernier zero-mark and the axis upon which the arm turns, a plumb-sight for initial observation arranged in front of the position of the telescope and a knife-blade sight intermediate between the said plumb-sight and the said axial reflector for the purpose of ascertaining when the said axial reflector and the ninety-degree mark on the arc are in the same horizontal plane.

4. In a reflection-measuring instrument, the combination with the frame and arc limb thereof, of an index-arm arranged to have its axial line serve in lieu of the natural horizon, a horizon-mirror fixed to said frame with its plane radial to the axis of the arm, and the index-mirror upon the said arm whereby measurements of angles from the central point is provided for.

5. In a reflection-measuring instrument, the combination with the frame and the arc limb thereof, of an index-arm arranged to have its axial line serve in lieu of the natural horizon, a horizon-mirror fixed to said frame with its plane radial to the axis of said arm, the index-mirror upon said arm whereby measurements of angles from the central point is permitted, and a telescope and sights arranged in line with the telescope and the axis of the index-arm.

6. In a reflection-measuring instrument, the combination with the frame and the arc limb thereof, of an index-arm arranged to have its axial line serve in lieu of the natural horizon, a horizon-mirror fixed to said frame with its plane radial to the axis of said arm, the index-mirror upon said arm, and a telescope and sights arranged in line with the telescope and the axis of the index-arm and the ninety-degree mark on said frame.

ERNEST KOSCINSKI.

Witnesses:
D. W. GARDNER,
GEO. WM. MIATT.